United States Patent [19]
Hoeting et al.

[11] Patent Number: 5,993,870
[45] Date of Patent: Nov. 30, 1999

[54] DEVICE FOR STORING AND COATING A CONFECTIONERY PRODUCT HAVING A HANDLE

[75] Inventors: Michael Hoeting; Sean Mullaney, both of Cincinnati, Ohio

[73] Assignee: Oddzon/Cap Toys, Inc., Pawtucket, R.I.

[21] Appl. No.: 09/014,468

[22] Filed: Jan. 28, 1998

[51] Int. Cl.[6] ............................................. A21D 10/02
[52] U.S. Cl. .................... 426/110; 426/112; 426/119; 426/134; 426/392
[58] Field of Search .................. 426/134, 110, 426/112, 392, 119

[56] References Cited

U.S. PATENT DOCUMENTS

| | | | |
|---|---|---|---|
| Re. 35,577 | 8/1997 | Coleman | 426/134 |
| 1,800,990 | 4/1931 | Forrest | 426/112 |
| 2,027,791 | 1/1936 | Schrager | 426/110 |
| 2,036,706 | 4/1936 | Law | 426/134 |
| 3,821,425 | 6/1974 | Russell | 426/110 |
| 4,821,906 | 4/1989 | Clark | 220/4.03 |
| 5,284,665 | 2/1994 | Molland | 426/87 |
| 5,324,527 | 6/1994 | Coleman | 426/134 |
| 5,370,884 | 12/1994 | Coleman | 426/112 |
| 5,405,009 | 4/1995 | Hackenbracht | 206/470 |
| 5,458,277 | 10/1995 | Wyzykowski | 224/202 |
| 5,503,857 | 4/1996 | Coleman et al. | 426/110 |
| 5,531,318 | 7/1996 | Coleman et al. | 206/738 |
| 5,615,941 | 4/1997 | Shecter | 362/109 |
| 5,702,742 | 12/1997 | Jones | 426/115 |
| 5,740,912 | 4/1998 | Chen | 206/457 |
| 5,773,058 | 6/1998 | Jones | 426/106 |

*Primary Examiner*—Nina Bhat
*Attorney, Agent, or Firm*—Laff, Whitesel & Saret, Ltd.

[57] ABSTRACT

A holder and coating device for use with handle-mounted confectionery products such as lollipops, or ice cream treats or the like. The confectionery holder holds and stores both a handle-mounted confectionery product and an edible topping of a particulate material, and facilitates coating the confectionery product with the topping. The holder has a base and a removable cover for gaining access to the confectionery product. The base holds a supply of the edible coating. When the device is manipulated, the edible coating is applied to the confectionery product.

14 Claims, 3 Drawing Sheets

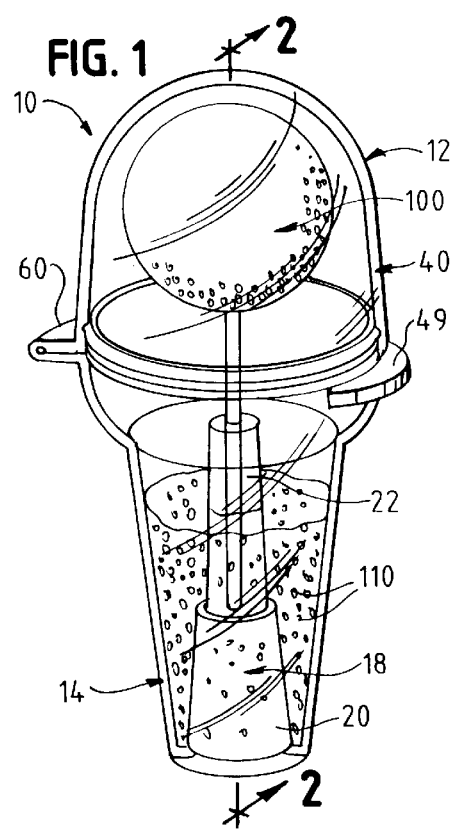
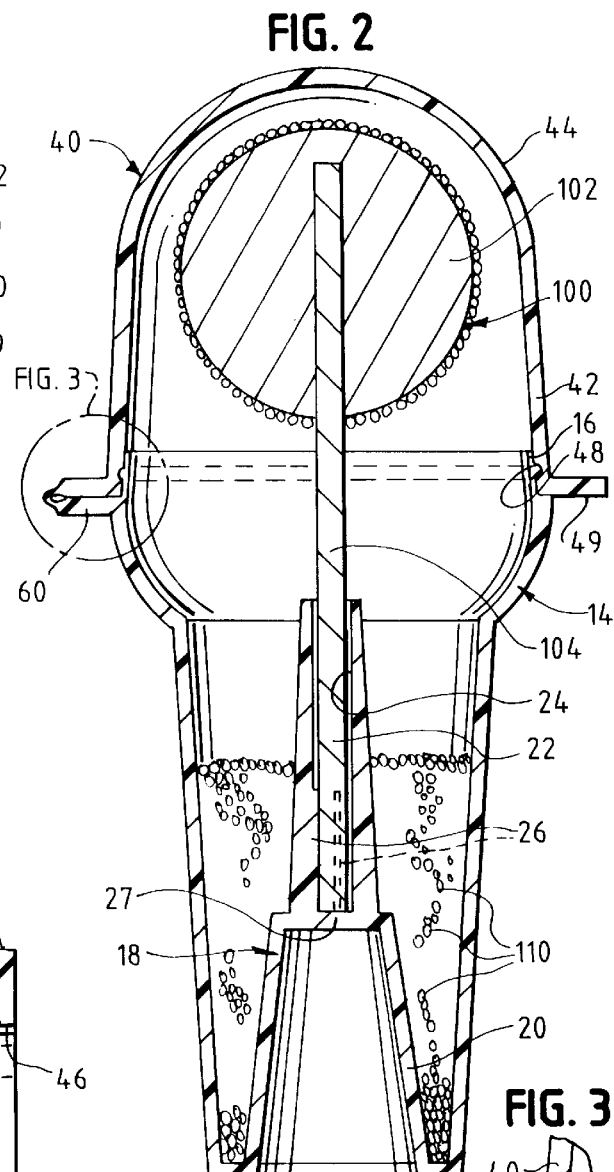
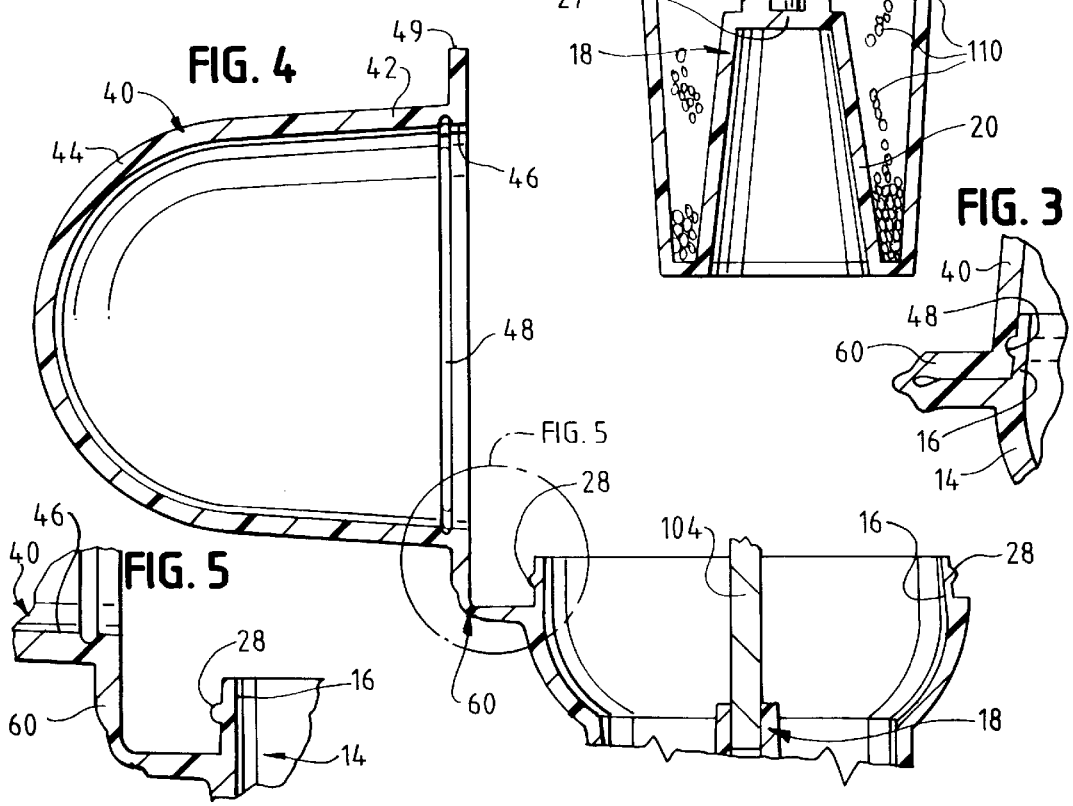

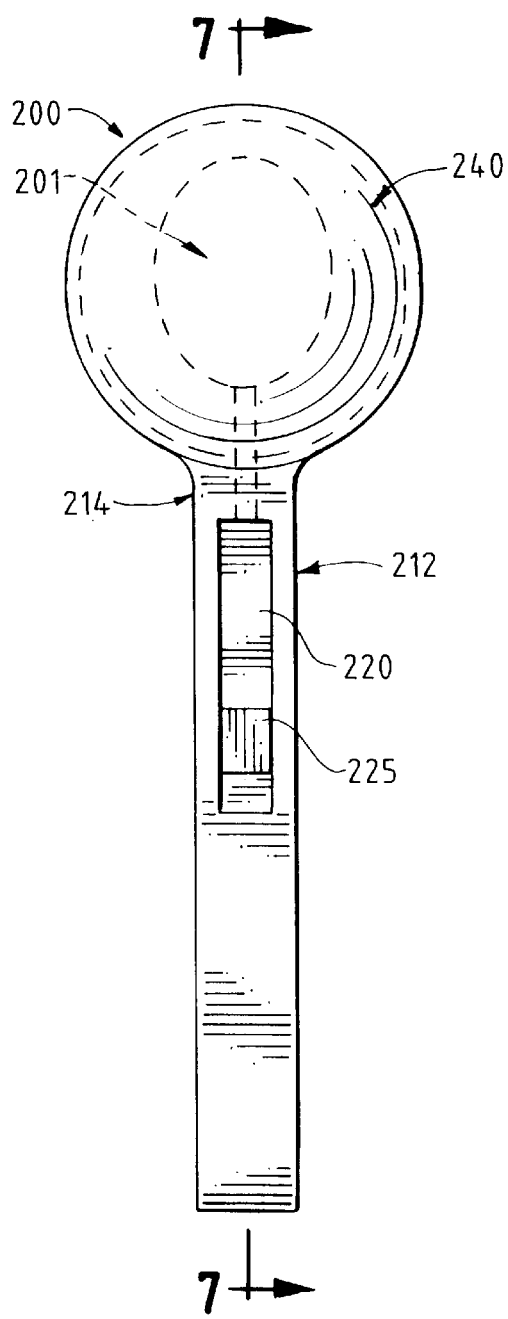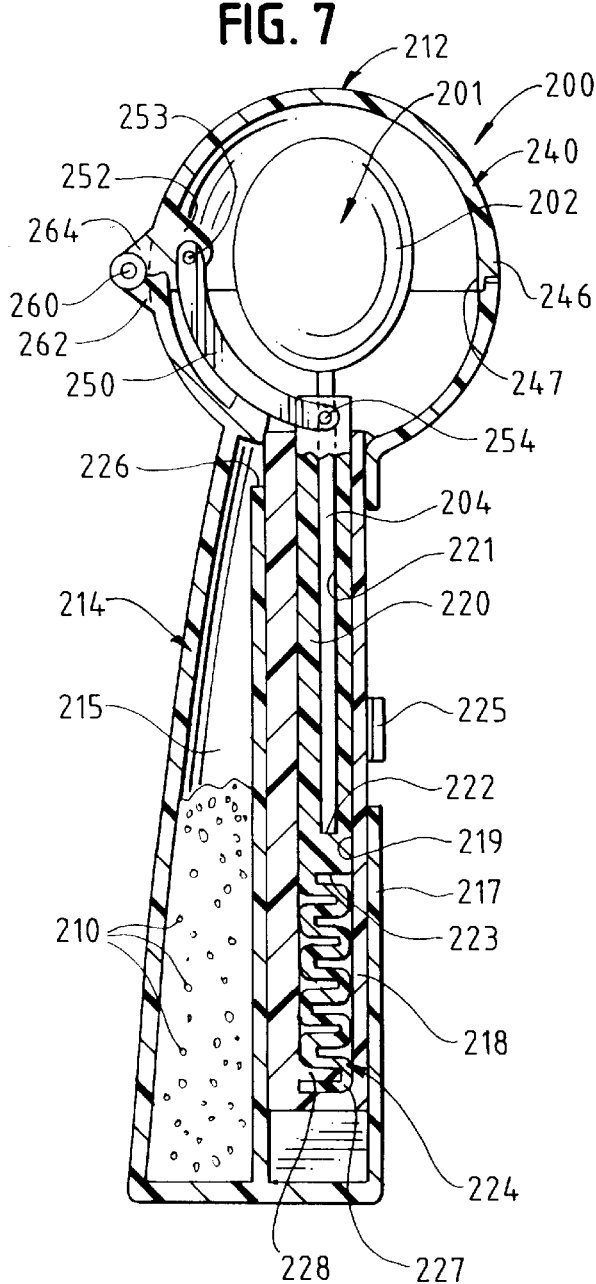

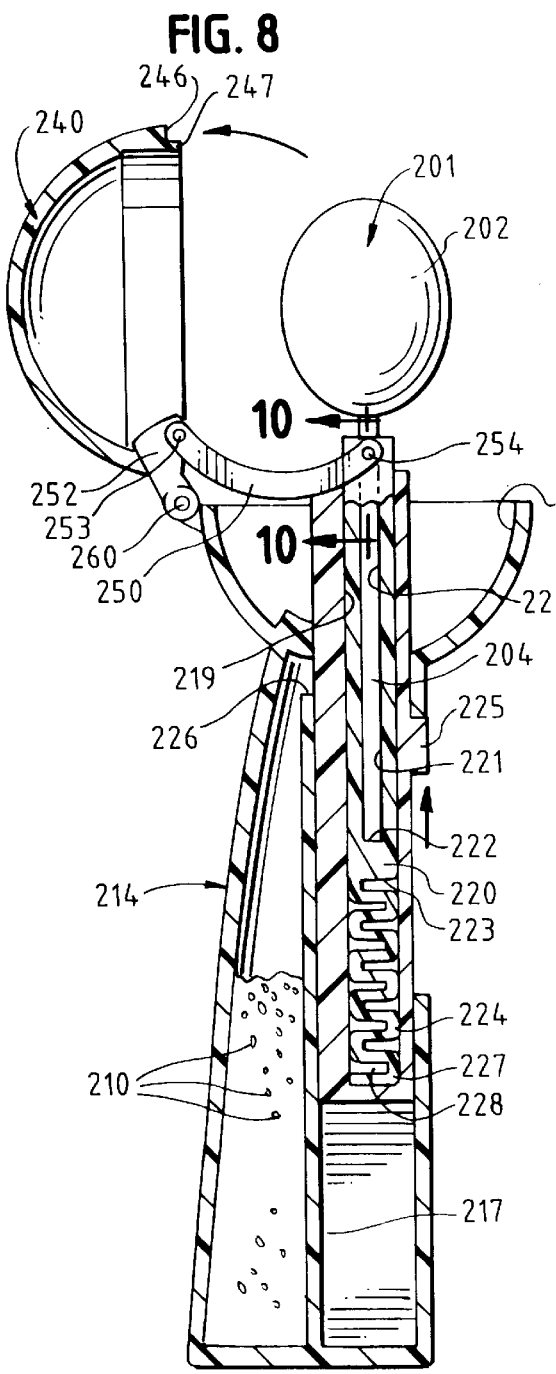
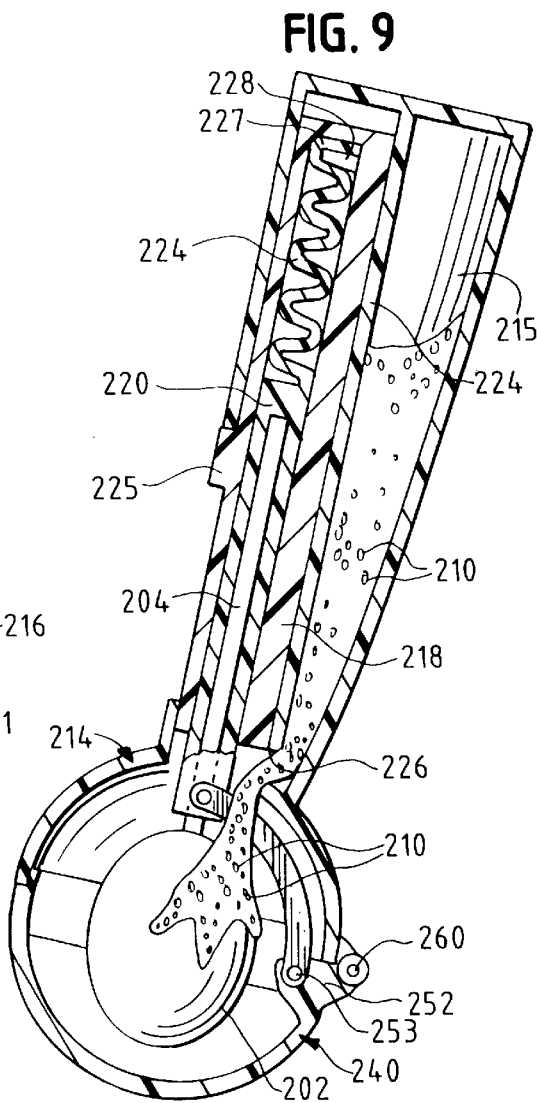
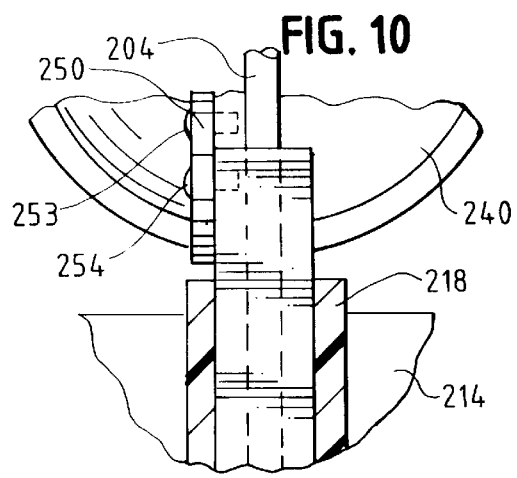

DEVICE FOR STORING AND COATING A CONFECTIONERY PRODUCT HAVING A HANDLE

FIELD OF THE INVENTION

This invention relates to a holder and coating device for use with handle-mounted confectionery products such as lollipops, or ice cream treats or the like. In particular, the invention relates to a confectionery holder that can be used to hold and store both a handle-mounted confectionery product and an edible topping of a particulate material, and to easily and cleanly coat the confectionery product with the topping by applying the topping to the confectionery product.

BACKGROUND OF THE INVENTION

A wide variety of confectionery products having handles are available in the marketplace. These include lollipops, frozen confections such as ice cream bars, among others. Frequently, such confectionery products are coated with edible particulate material, such as candy sprinkles or jimmies, crushed nuts, powders and the like, and are provided to the consumer in that form.

It has been considered potentially desirable to provide consumers with granulated or particulate materials, such as sprinkles, jimmies or the like, to be applied to such confectionery products. However, the application of such materials is difficult, and can be exceedingly messy. Further, when such products can be stored (such as lollipops and suckers can be), it is sometimes desirable to provide for the storage of such products. Because such products are often sticky, a means for preventing their contamination and avoiding their contact with the surrounding environment would be desirable.

Thus, it would be of advantage to provide a device which makes it possible both to easily and cleanly store a confectionery product having a handle, as well as to coat such a product with a granulated or particulate material.

The prior art does not provide such a device. For example, Coleman U.S. Pat. No. 5,370,884 discloses a powder reservoir and a threaded cap. The cap is adapted to hold a candy sucker which can be wetted and dipped into the powder reservoir. To use the device of U.S. Pat. No. 5,370,884, the user must employ both hands to unscrew the cap and must dip the sucker into the powder reservoir. This device requires a level of dexterity and coordination often lacking in children, can result in spillage and is difficult to use in a manner which will provide a uniform coating.

It is therefore an object of the present invention to provide a device for both cleanly storing a confectionery product having a handle and for coating such a product with a granulated or particulate material in a generally uniform manner, all while minimizing spillage.

SUMMARY OF THE INVENTION

A device for storing a confectionery product having a handle and a confection at one end of the handle and a particulate edible coating material, and for coating the confection with a layer of the particulate edible coating material in accordance with the present invention comprises an elongated housing having a base with an upper mouth and a cover which is adapted for releasable sealing securance to the base. The base defines a receptacle in its lower regions for containing a particulate edible coating material and defines means for receiving a confectionery product handle and for supporting the confection above the receptacle. The cover is positioned to close and seal the upper mouth and, when it is so positioned, encloses the confection and prevents the escape of particulate edible coating material. When the cover is released, ready access to the confectionery product is provided for use of the confectionery product and for removal of the confectionery product from the housing. When the base and cover are sealingly secured, the confectionery product may be stored therein and the housing may be manually manipulated to bring particulate edible coating material into contact with the surface of the confection to coat the confection with a layer of particulate edible coating material.

Desirably, hinge means are provided which permanently connect the base and cover to each other, preferably integrally, and the means for receiving a confectionery product handle comprises a post defining an upwardly opening tubular opening for receiving a handle.

Preferably, the base and cover define cooperating sealing formations for preventing the escape of particulate edible coating material from the housing, and the cover is dome-shaped and terminates downwardly in a mouth which is larger than the confection, the mouth of the cover being adapted to sealingly engage the upper mouth of the base, and the mouths of the base and the cover define the cooperating sealing formations.

The invention further comprises a method of storing a confectionery product having a handle and a confection at one end of the handle and a particulate edible coating and for coating the confection with a layer of the particulate edible coating comprising the steps of providing an elongated housing comprising a base having an upper mouth and a cover adapted for releasable sealing securance to the base, the base defining a receptacle therein for containing a particulate edible coating material and defining means for receiving a confectionery product handle and for supporting the confection above the receptacle; inserting a confectionery product in the base with the handle in the handle receiving means; providing particulate edible coating material in the lower regions; moistening the surface of the confection; sealingly securing the cover to the base; and manipulating the housing to bring particulate edible coating material into contact with the surface of the confection to coat the confection with a layer of the particulate material.

Further objects, features and advantages of the present invention will become apparent from the following description and drawings.

BRIEF DESCRIPTION OF THE DRAWINGS

FIG. 1 is a perspective view of a storing and coating device of the present invention;

FIG. 2 is a cross-sectional view of the device of FIG. 1 taken generally along line 2—2 of FIG. 1 with the cover in a closed position;

FIG. 3 is an enlarged fragmentary view of a portion of FIG. 2;

FIG. 4 is an enlarged fragmentary cross-sectional view like FIG. 2 but with the cover in an open position;

FIG. 5 is an enlarged fragmentary view of a portion of FIG. 4;

FIG. 6 is a front elevational view of another embodiment of a storing and coating device of the present invention;

FIG. 7 is a cross-sectional view taken substantially along line 7—7 of FIG. 6;

FIG. 8 is a view like FIG. 7, but with the cover in an open position;

FIG. 9 is a view like FIG. 7, but of the device in an inverted position with the receptacle open; and FIG. 10 is a fragmentary view of a portion of the device of FIG. 6.

DETAILED DESCRIPTION

A presently preferred embodiment of a device 10 for storing and coating the confection portion of a confectionery product having a handle with a particulate edible coating material is shown in FIGS. 1–5. In that embodiment, the confectionery product is illustrated as a lollipop 100 comprising a confection portion, such as a hard candy confection 102, and an elongated handle, such as a cylindrical or round stick 104. Other lollipops and handles of other shapes may be used. Other confectionery products may also be stored and coated in storage and coating devices made in accordance with the present invention. Also, in the preferred embodiment the particulate edible coating material is illustrated as round candy sprinkles 110 which may be about 1/32 inch in diameter. Other particulate material and sizes may be used as well, such as elongated sprinkles, jimmies, crushed nuts, etc.

As seen in the drawings, the storage and coating device 10 comprises an elongated housing 12 having an elongated, frusto-conical base 14 having an upper mouth 16 at its upper end and a cover 40. Cover 40 is releasably secured to base 14. The device 10 may be of a plastic material which may desirably be transparent or translucent. Base 14 may serve as a handle for the device 10.

At its lower end, base 14 defines a post 18 having a lower frusto-conical support section 20 and an upper tubular section 22 defining a tubular opening 24. The tubular opening 24 is cylindrical in shape to generally conform to the shape of the round stick 104 of the confectionery product or lollipop 100. Desirably, the sizes of the tubular opening and the stick 104 are generally the same and the opening 24 defines one or more inwardly projecting elongated sections or elements 26 to provide a gentle grip-fit between the stick 104 and the wall of the opening 24. That facilitates firm retention of the lollipop when the storing and coating device 10 is manipulated, as by inverting and shaking it to coat the confection 102 with the particulate coating material 110. Finally, the base 27 of the tubular opening may serve as a stop for the end of the stick 104 thereby to position the confection 102 at a desired selected minimum elevation. The upper mouth 16 at the top of the base 14 defines an outer peripheral bead 28.

The base 14 is enclosed at its upper end by the removable dome-shaped cover 40. Cover 40 has a lower generally cylindrical section 42 and an upper generally parti-cylindrical dome 44. Cover 40 terminates downwardly in a mouth 46 which is larger than the confection and which is adapted to engage the upper mouth of the base. Mouth 46 may define a perimetric internal recess 48 which generally matches and receives the complementary peripheral bead 28, preferably in a sealing relationship sufficient to prevent the escape of particulate material 110.

The base 14 and cover 40 are connected by a hinge such as a living hinge 60 which is integrally formed with each and which integrally and permanently secures the base 14 and cover 40 to each other.

As will now be apparent, cover 40 and its mouth 46 are sealingly secured to base 14 and its upper mouth 16 via complementary perimetric configurations, namely by base bead 28 and dome recess 48. These snap together and, when juxtaposed or snapped together, seal and prevent the escape of particulate material from the elongated housing 12 formed by the base 14 and cover 40. To separate the complementary bead 28 and recess 48, the cover 40 may be provided with a thumb tab 49 which is positioned diametrically opposite from the hinge 60. Upward pressure on the thumb tab 49, while gripping the base 14, will release the bead 28 and recess 48. The living hinge 60 is designed to force the cover 40 to a position as typically illustrated by FIG. 4 in which the confection 102 and stick 104 are exposed and accessible to be gripped by a user for removal from the housing 12 or, when desired, to enable a user to moisten and even consume the confection 102 while the lollipop 100 remains in its mounted position in the housing 12.

The storing and coating device 10 may be used as follows. Assuming that a lollipop 100 has been inserted in base 14 with stick 104 seated and supported in tubular opening 24 with the confection being supported above the lower regions of the base, and that a particulate edible coating material 110 is provided and located in the receptacle formed in the base 14, such as in its lower regions, the cover 40 is opened to expose the confection 102 so that the surface of the confection 102 may be moistened, such as by licking it. Thereafter, the cover 40 is closed by engaging and closing the mouths 16 and 46 and engaging the cooperating sealing formations, the bead 28 and recess 48. The device 10 is then manipulated, as by shaking it, inverting it or by otherwise causing the particulate material 110 in the receptacle to come into contact with the moistened surface of the confection 102. In that manner, a generally uniform layer of the particulate edible coating material will be provided on the surface of the confection 102.

Thereafter, the device 10 may be returned to a vertical orientation, in which the remaining particulate material returns to the receptacle, and the cover 40 may be opened, as by forcing the thumb tab 49 upwardly, thereby to expose the lollipop 100 and coated confection 102. At that time the user may lick the confection 102 or the user may remove the lollipop 100 from the device 10 for holding by the handle 104. The device 10 may be reused by inserting a new lollipop 100, or by inserting a partially used lollipop 100, and by repeating the steps just set forth.

The handle receiving formation in the base of the housing may be of other shapes conforming to the stick of the confectionery product with which it is to be used, or may be configured to be universal to a variety of stick cross-sectional dimensions and shapes, within reasonable limits, as by providing a receiving means, such as a series of flexible fingers, which will deform to accommodate such different sizes and shapes, or of some other suitable configuration.

Although the releasable cover 40 has been shown as one which is hinged to the base 14, a cover 40 could be entirely separate. Such a cover could be connectable to a base, as by cooperating screw threads in the cover and base or by cooperating bayonet formations. Desirably the cooperating formations would also serve to seal the cover and base against the escape of particulate material during the coating process.

Referring now to FIGS. 6–10, a further embodiment of a device 200 for storing and coating the confection portion of a confectionery product having a handle with a particulate edible coating material is there shown. In that embodiment, the confectionery product is illustrated as a lollipop 201 comprising a confection portion, such as a hard candy confection 202, and an elongated handle, such as a cylindrical or round stick 204. Other lollipops and handles of other shapes may be used with it. The particulate edible coating material is illustrated as round candy sprinkles 210 and may be like those described above. Other particulate material and sizes may be used as well.

As shown in FIGS. 6–8, the storage and coating device 200 comprises an elongated housing 212 having a lower elongated base 214 having an upper mouth 216 at its upper end and a cover 240. Cover 240 is connected to the base and is sealingly secured thereto. The device 200 may be entirely or substantially formed of suitable plastic materials.

Base 214, which may serve as a handle, defines a receptacle 215 for containing particulate edible coating material 210 and includes an elongated guide 217 in which a slidable post 218 may move longitudinally relative to the base 214.

Post 218 defines a tubular opening 219. A slidable tubular support 220 is positioned in the opening 219 and, in turn, defines an elongated opening 221 for receiving the stick 204 of the lollipop 201. Preferably, the fit between the stick 204 and the opening 221 is one in which the stick 204 is firmly but removably held within the opening 221. The opening 221 terminates at its base in a seat 222 which limits the depth to which the stick 204 may descend, thereby controlling the elevation of the confection 202 in the device 200. Post 218 also provides an operating tab 225 which is formed therewith.

The lower end 223 of the support 220 is supported in the post 218 on a resilient means such as a spring 224. Spring 224 may be of a plastic material and in one form may be integrally formed with the slidable tubular support 220. Desirably, spring 224 is a tension spring.

The base 214 is enclosed at its upper end by the removable, generally parti-cylindrical, dome-shaped cover 240. Cover 240 terminates downwardly in a mouth 246 which is larger than the confection 202 and which is adapted to engage the mouth 216 of the base 214. Mouth 246 may define a shoulder 247 which generally matches and engages the complementary mouth 216 of the base, preferably in a sealing relationship sufficient to prevent the escape of particulate material 210.

The base 214 and cover 240 are hingedly connected as by a hinge pin 260 which connects complementary hinge members 262, 264. Members 262, 264 are integrally formed with the base 214 and cover 240, respectively, and preferably permanently connect the base 214 and cover 240 to each other.

As may be seen in the drawings, in a first, closed position of rest (FIGS. 6 and 7), the cover 240 is in a closed position with its mouth 246 in sealing engagement with the mouth 216 of the base 214. In this position, the link 250 which is also pivotally connected to a post 252 on the cover 240 via a hinge pin 253 at one end and which is also pivotally connected to the support 220 via a hinge pin 254 at the other end, forces the support 220 into a predetermined position relative to the cover 240. In this position, the receptacle 215 is closed off at its top by the slidable post 218. In this position, post 218 is elevated so that its upper portion bridges and closes the window 226 located adjacent to the upper end of the guide 217. The spring 224 is selected so that it will tend to allow the post 218 to assume the position of FIG. 7 as a preferred position. Thus, in the embodiment illustrated, spring 224 is a tension spring.

When it is desired to apply the particulate edible coating material 210 to the confection 202, the device 200 is first opened, as generally illustrated by FIG. 8. The device 200 is opened to that position by pushing upwardly on the operating tab 225. This forces the cover 240 to the open position of FIG. 8, via link 250 which causes the cover 240 to pivot about hinge pin 260. In that position, the confection 202 can be suitably moistened, as by one's tongue and mouth. Once that is accomplished, the slidable post 218 is drawn downwardly by pulling down on the operating tab 225. This draws the lollipop 201 down because the tubular support 220 and integral spring 224 are connected and the spring 224 is in turn connected at its base 227 to the slidable post 218 as by a finger 228.

When the operating tab 225 reaches the lower position of rest of FIG. 7, the device 200 is closed and the receptacle 215 is also sealed off from the interior of the cover 240.

When the tab 225 is moved downwardly further, namely from the position of FIG. 7 to that of FIG. 9, the window 226 opens and the contents of the receptacle 215 are exposed to and in flow communication with the interior of the cover 240. When the device 200 is inverted, as represented by FIG. 9, particulate edible coating material passes into the coating compartment formed by the interior of the cover 240 and complementary upper portion of the base 214. As desired or necessary, the device 200 may be manipulated or shaken to cause the particulate material to contact the surfaces of the confection 202 to provide a generally uniform or complete coating.

Once the user is satisfied that the coating is suitably complete, the device 200 is returned to its upright position. The operating tab 225, if it has been released, is again moved to the lower position of FIG. 9. That permits any unused or free particulate material to return through the window 226 to the receptacle 215. Thereafter, the operating tab 225 may be returned to the position of FIG. 7 by manual manipulation or by the force of spring 224. Once the window 226 closes, the device 200 may be opened to the position of FIG. 8 in which the confection is exposed for use. At that time, the user may lick the confection 202 or the user may remove the lollipop 201 from the device 200 for holding by its handle 204. The device 200 may be reused by inserting a new lollipop 201 or by inserting a partially used lollipop 201, and by repeating the steps just set forth.

It will be apparent to those skilled in the art that modifications may be made without departing from the spirit and scope of the invention. Accordingly, it is not intended that the invention be limited except as may be necessary in view of the appended claims.

What is claimed is:

1. A device for storing a confectionery product having a handle and a confection at one end of the handle and a particulate edible coating material and for coating the confection with a layer of said particulate edible coating material comprising:

an elongated housing comprising a base having an upper mouth, and a cover adapted for releasable sealing securance to said base, said base defining a receptacle therein for containing a particulate edible coating material and defining means comprising a post defining an upwardly opening tubular opening for receiving a said confectionery product handle and for supporting said confection above said receptacle, said cover being positioned to close and seal said upper mouth, and when so positioned, enclosing said confection and preventing escape of said particulate edible coating material, and when released, providing ready access to said confectionery product for removal of said confectionery product from said housing, and whereby when said base and cover are sealingly secured, said confectionery product may be stored therein and said housing may be manually manipulated to bring particulate edible coating material into contact with the surface of said confection to coat said confection with a layer of particulate material.

2. The storing and coating device of claim 1, and further comprising hinge means permanently connecting said base and said cover to each other.

3. The storing and coating device of claim 2, and wherein said hinge means is integral with said base and said cover.

4. The storing and coating device of claim 1, and wherein said base and said cover define cooperating sealing formations for preventing the escape of particulate edible coating material from said housing.

5. The storing and coating device of claim 4, and wherein said cover is dome-shaped and terminates downwardly in a mouth which is larger than said confection, and which is adapted to engage the upper mouth of said base, and wherein the mouths of said base and said cover define said cooperating sealing formations.

6. The storing and coating device of claim 1, and wherein said base defines a window for providing flow communication between said receptacle and the interior of said cover.

7. The storing and coating device of claim 6, wherein said means for receiving a confectionery product handle comprises a reciprocable post and said base defines a guide for slidably receiving said post.

8. The storing and coating device of claim 7, wherein said post closes said window in a first reciprocable position of said post and opens said window in a second reciprocable position of said post to provide flow communication between said receptacle and the interior of said cover.

9. The storing and coating device of claim 8, wherein said reciprocable post mounts a tubular guide for receiving said confectionery product handle, said guide mounting a link secured at one end to said cover for opening and closing said cover as said post is reciprocated.

10. A method of storing a confectionery product having a handle and a confection at one end of the handle and a particulate edible coating and for coating the confection with a layer of said particulate edible coating comprising the steps of:

providing an elongated housing comprising a base having an upper mouth and a cover adapted for releasable sealing securance to the base, said base defining a receptacle therein for containing a particulate edible coating material and defining post means for grippingly receiving a confectionery product handle and for supporting said confection above said receptable, inserting a confectionery product in said base with said handle in said handle receiving means, providing particulate edible coating material in said receptacle, moistening the surface of said confection, sealingly securing said cover to said base, and manipulating said housing to bring particulate edible coating material into contact with the surface of said confection to coat said confection with a layer of said particulate material.

11. The method in accordance with claim 10, and wherein the step of providing an elongated housing comprises providing cooperating sealing formations on said base and said cover for preventing the escape of particulate edible coating material.

12. The method in accordance with claim 11, and wherein said cover is dome-shaped and terminates downwardly in a mouth which is larger than said confection, and which is adapted to engage the upper mouth of said base, and wherein the mouths of said base and said cover define said cooperating sealing formations.

13. The method in accordance with claim 10, and wherein said housing provides a window between said receptacle and said cover for providing flow communication therebetween.

14. The method in accordance with claim 13, and comprising the further steps of normally closing said window to prevent flow communication between and receptacle and said cover, and opening said window immediately prior to said manipulating step.

* * * * *